UNITED STATES PATENT OFFICE.

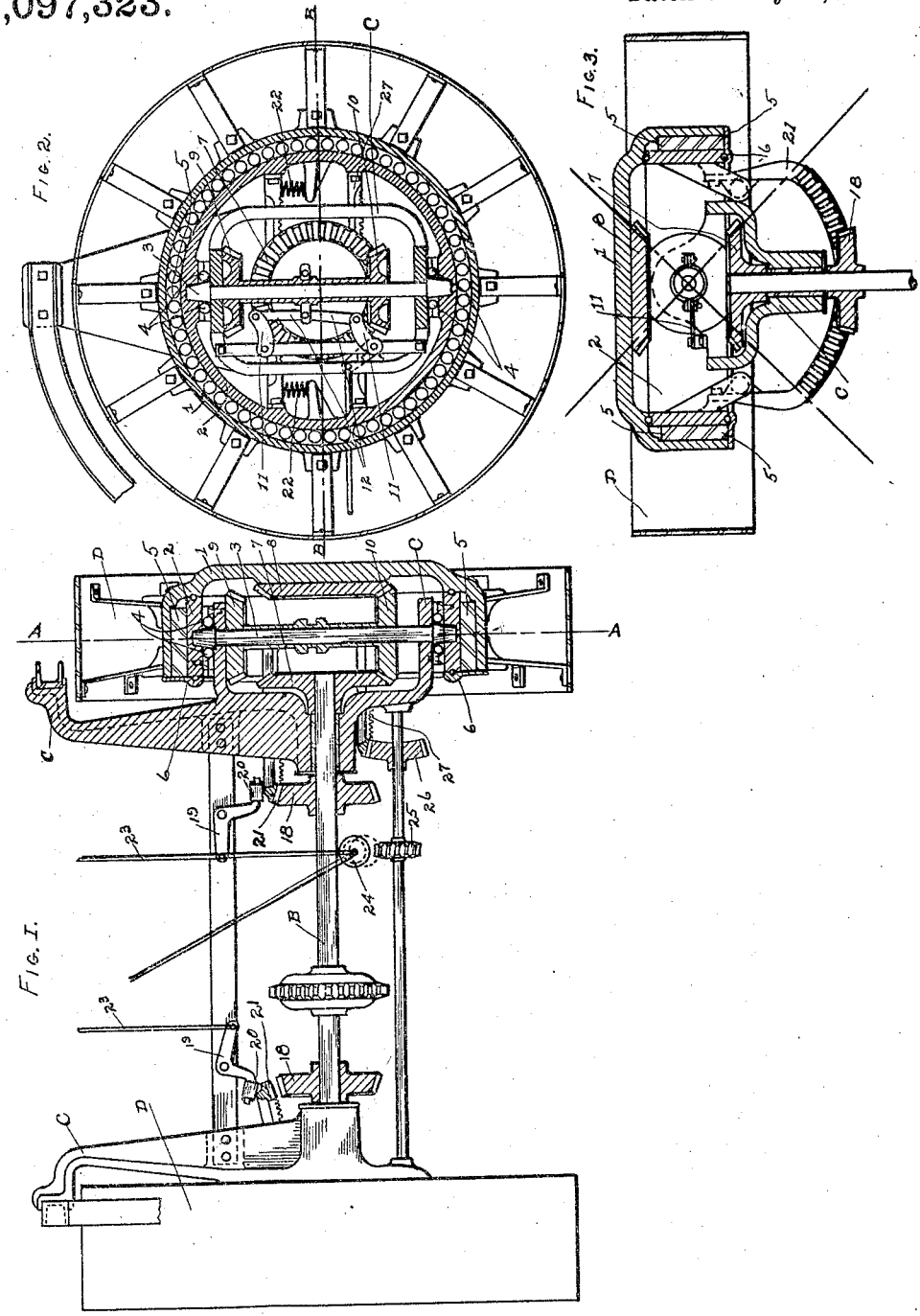

WILLIAM T. HUTCHISON, OF SOUTH BEND, INDIANA.

TRACTION-ENGINE.

1,097,323.         Specification of Letters Patent.         Patented May 19, 1914.

Application filed July 2, 1913. Serial No. 777,066.

*To all whom it may concern:*

Be it known that I, WILLIAM T. HUTCHISON, a citizen of the United States, residing at South Bend, in the county of St. Joseph and State of Indiana, have invented a new and useful Improvement in Traction-Engines, of which the following is a specification.

My invention relates to a new kind of steerable drive wheels, whereby the drive-wheels are easily and efficiently steered to a great degree of angle, thus permitting the turning of large tractors in comparatively small places. The wheel being pivoted on a direct line of the center of the symmetric plane of the tread causes very little resistance in steering or changing the angle of said wheels.

I have also provided means for sliding oppositely disposed bevel gears on the vertical pivot shaft for changing them forward to reverse speed, or vice versa. For the bearings of the said pivot shaft, I have provided means for use of ball-bearings which are in action whenever said wheels are in motion. The main wheel bearings are run on rollers incased and dust-proof. The axle is also provided with roller-bearings properly protected from dirt. Placed oppositely and close to main castings for frame are two oppositely disposed bevel gears keyed to axle for engagement with a semi-circle gear pivotally fastened to inside wheel bearing for the purpose of steering the wheels from motion of axle. By having oppositely disposed gears, the direction of the wheels can be changed either to right or left by engaging the semi-circle gears with either one of said gears according to the direction desired. When the controlling lever is released, a spring disengages said semi-circle gear. Means are also provided so that only one gear may be engaged at a time. Means are also provided to disengage hand steering worm when either of said semi-circle gears are engaged.

I aim to provide a tractor drive wheel pivoted in the center of the tread with simple, durable, and efficient construction and design.

With the above recited objects in view, and others of a similar nature, the invention consists in the construction, combination, and arrangement of parts hereinafter set forth in and falling within the scope of the appended claims.

Figure 1, is a vertical, longitudinal, sectional view in half, taken on a center line showing bevel gears with one meshed for forward speed. Fig. 2, is a sectional end view of the whole wheel at A. A. in Fig. 1. Fig. 3, is a sectional bottom view of the whole wheel at B. B., taken from the bottom instead of from the top, to show the semi-circle steering gear.

Similar reference characters designate like parts throughout the several views.

Referring now to the accompanying drawings in detail, the letter B, indicates the drive axle, and the letter C indicates the axle bearing the engine frame support, while D indicates the wheel. Inside bearing 2, is pivoted on the vertical pivot shaft 3 and ball-bearings 4 support casing 2, and also form bearing for vertical pivot shaft 3. Rollers 5, is main bearing for drive wheels, and 6 together with a portion of 7, fitted with ball-bearings is means for holding wheel in proper place and alinement. Keyed on the ends of the drive axle, B, are bevel gears 7, which mesh with either of the bevel gears 9 and 10, and gears 9 and 10 mesh with bevel gear 8, which is secured to outside bearing 1, this driving the wheels in opposite direction to the drive axle B. Arms 11 connected by links 12 controlled by connection to hand lever suitably located for the operator are for shifting gears to forward or reverse speed, or for disengagement entirely of the drive gear.

I am aware that prior to my invention centrally pivoted wheels have been made, I therefore, do not claim such a combination broadly, but

I claim:

1. The combination, in a traction engine, of a driving gear, two oppositely placed gears and solidly connected with each other loosely mounted on a vertical pivot shaft, adapted to be shifted, engaging either one or neither and transmitting the power by another bevel gear to the drive wheel.

2. A driving gear engaging either of a pair of oppositely placed gears pivoted on a center in direct line of two directly opposite points of the center of the wheel tread.

WILLIAM T. HUTCHISON

Witnesses:
    GEO. KENNEDY,
    S. H. YANCEY.